United States Patent [19]

Morrill

[11] 4,397,571
[45] Aug. 9, 1983

[54] REVERSIBLE LUBRICATION SYSTEM FOR DYNAMOELECTRIC MACHINE

[76] Inventor: Wayne J. Morrill, 3448 S. Washington Rd., Fort Wayne, Ind. 46804

[21] Appl. No.: 194,046

[22] Filed: Oct. 6, 1980

Related U.S. Application Data

[63] Continuation of Ser. No. 940,471, Sep. 8, 1978, abandoned, which is a continuation-in-part of Ser. No. 892,656, Apr. 3, 1978, abandoned.

[51] Int. Cl.³ .......................................... F16C 17/02
[52] U.S. Cl. .................................. 384/397; 384/398
[58] Field of Search .............. 308/121, 132, 122, 125, 308/131, 126; 384/397, 398, 402, 409, 411, 412

[56] References Cited

U.S. PATENT DOCUMENTS

| | | | |
|---|---|---|---|
| 3,243,241 | 3/1966 | Lindt | 308/132 |
| 3,336,092 | 8/1967 | Dochterman | 308/132 |
| 3,420,335 | 1/1969 | Dochterman | 308/132 |
| 3,745,391 | 7/1973 | Dochterman | 308/132 |

*Primary Examiner*—Lenard A. Footland
*Attorney, Agent, or Firm*—Gust, Irish, Jeffers & Hoffman

[57] ABSTRACT

A unit bearing motor includes a frame member having opposite sides and a bearing post thereon, the bearing post having first and second opposite ends with first and second spaced bearing portions respectively extending axially inwardly from the ends. The bearing post has a first portion extending from one side of the frame member to the first end and a second portion extending from the other side of the frame member to the second end. The shaft of the machine is rotatably supported in the bearing portions and has a portion extending from the first end of the bearing post for supporting the rotor of the machine. A cup member is secured to the other side of the frame member and encloses the second portion of the bearing post to define a lubricant reservoir. The frame member has openings formed therethrough outwardly from the bearing post and communicating with the reservoir. Lubricant absorbent material is located in the reservoir and a first wick is arranged to abstract lubricant from the absorbent material and to feed it to the second bearing portion in one direction of shaft rotation and to return lubricant from the second bearing portion to the absorbent material in the other. A second wick extends over the first bearing post portion and has portions extending through a frame opening and arranged to return lubricant to the absorbent material, and to remove lubricant from the first bearing portion in the one direction of shaft rotation, and to extract lubricant from the absorbent material and feed it to the first bearing portion in the other.

4 Claims, 10 Drawing Figures

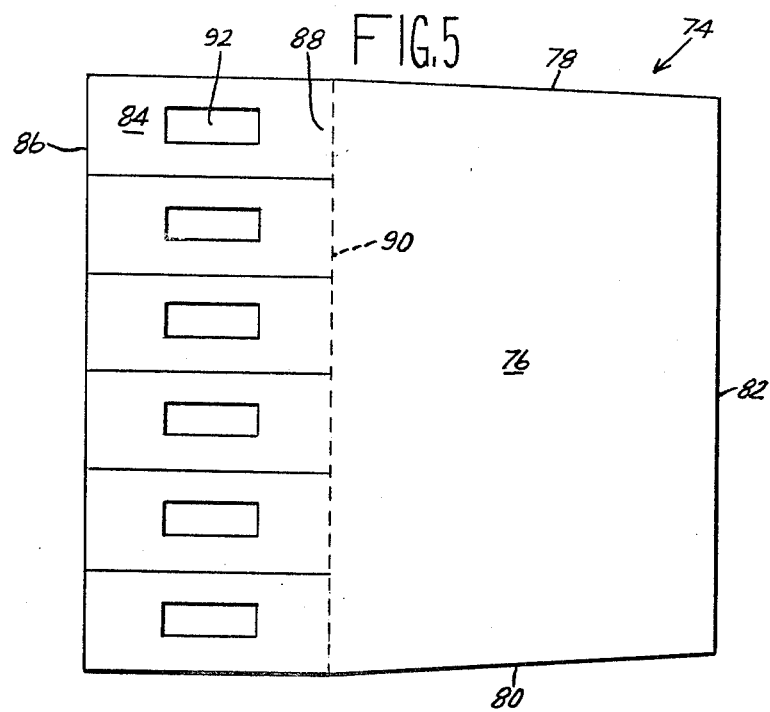
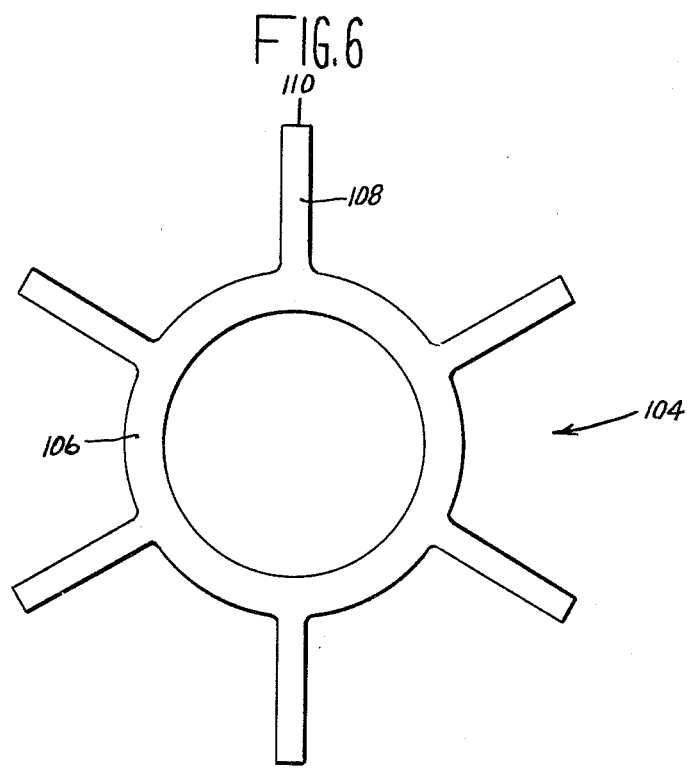

REVERSIBLE LUBRICATION SYSTEM FOR DYNAMOELECTRIC MACHINE

This application is a continuation of application Ser. No. 940,471, filed Sept. 8, 1978, abandoned, which is a continuation-in-part of my application Ser. No. 892,656, filed Apr. 3, 1978, abandoned.

BACKGROUND OF THE INVENTION

1. Field of the Invention

This invention relates generally to lubrication systems for unit bearing motors, and more particularly to a reversible lubrication system for such motors.

2. Description of the Prior Art

The unit or single bearing construction is commonly employed for sub-fractional shaded pole and capacitor motors and typically incorporates a bearing post extending from one side of a wall of a frame member and having the shaft of the motor journalled therein. A cup is secured to the other side of the wall and forms a lubricant reservoir therewith into which one end of the shaft extends. Lubricant absorbent material is positioned in the reservoir and a wick conveys lubricant to the shaft end, the lubricant being conveyed along the shaft for lubrication of the bearing by a spiral pumping groove. While that construction has been entirely satisfactory in the case of non-reversible motors, such as shaded pole motors, it has not provided satisfactory lubrication in the case of reversible motors, such as capacitor motors, and it is therefore desirable to provide a reversible lubrication system for unit bearing motors.

SUMMARY OF THE INVENTION

The invention, in its broader aspects, provides a reversible lubrication system for a motor which includes a frame member having sleeve bearing means thereon with first and second spaced opposite ends and a shaft rotatably supported therein having portions respectively extending from the opposite ends thereof. First lubricant absorbent means is provided for feeding lubricant to the shaft adjacent the first end of the bearing means and for removing lubricant therefrom. Lubricant reservoir means is provided for supplying lubricant to the first lubricant absorbent means and for abstracting lubricant therefrom. Means are provided on the shaft for causing positive flow of lubricant through the bearing means from the first to the second end thereof in response to one direction of shaft rotation and from the second to the first end in response to shaft rotation in the opposite direction. Second lubricant absorbent means is provided for removing lubricant from the shaft adjacent the second bearing means end in response to shaft rotation in the one direction and for feeding lubricant thereto in response to shaft rotation in the opposite direction, and means is provided for returning lubricant from the second lubricant absorbing means to the reservoir means. The first lubricant absorbent means feeds lubricant from the reservoir means to the shaft in response to rotation thereof in the one direction and removes lubricant from the shaft and returns the same to the reservoir means in response to shaft rotation in the opposite direction.

The invention, in a specific aspect, provides a unit bearing motor including a frame member having opposite sides and a bearing post thereon, the bearing post having first and second opposite ends with first and second spaced bearing portions respectively extending axially inwardly from the ends. The bearing post has a first portion extending from one side of the frame member to the first end and a second portion extending from the other side to the second end. The shaft of the machine is rotatably supported in the bearing portions and has a portion extending from the first end of the bearing post. A cup member is secured to the other side of the frame member and encloses the second portion of the bearing post to define a lubricant reservoir, the frame member having at least one opening formed therethrough outwardly from the bearing post and communicating with the reservoir. Lubricant absorbent material is positioned in the reservoir and first wick means also in the reservoir has a first portion arranged in lubricant-transfer relation with the absorbent material and a second portion arranged to wipe the shaft adjacent the second bearing portion. Second wick means extends over the first bearing post portion and has a first portion extending through the frame opening and arranged in lubricant-transfer relation with the absorbent material and a second portion arranged to wipe the shaft adjacent the first bearing portion.

It is accordingly an object of the present invention to provide a reversible lubrication system for a motor.

Another object of the present inventon is to provide a reversible lubrication system for a unit bearing motor.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 5 is a view of the sleeve wick member of the previous figures prior to its being secured on the bearing post;

FIG. 6 is an end view of the spring retainer member shown in FIGS. 1 and 4;

DESCRIPTION OF THE PREFERRED EMBODIMENT

Figure 1:
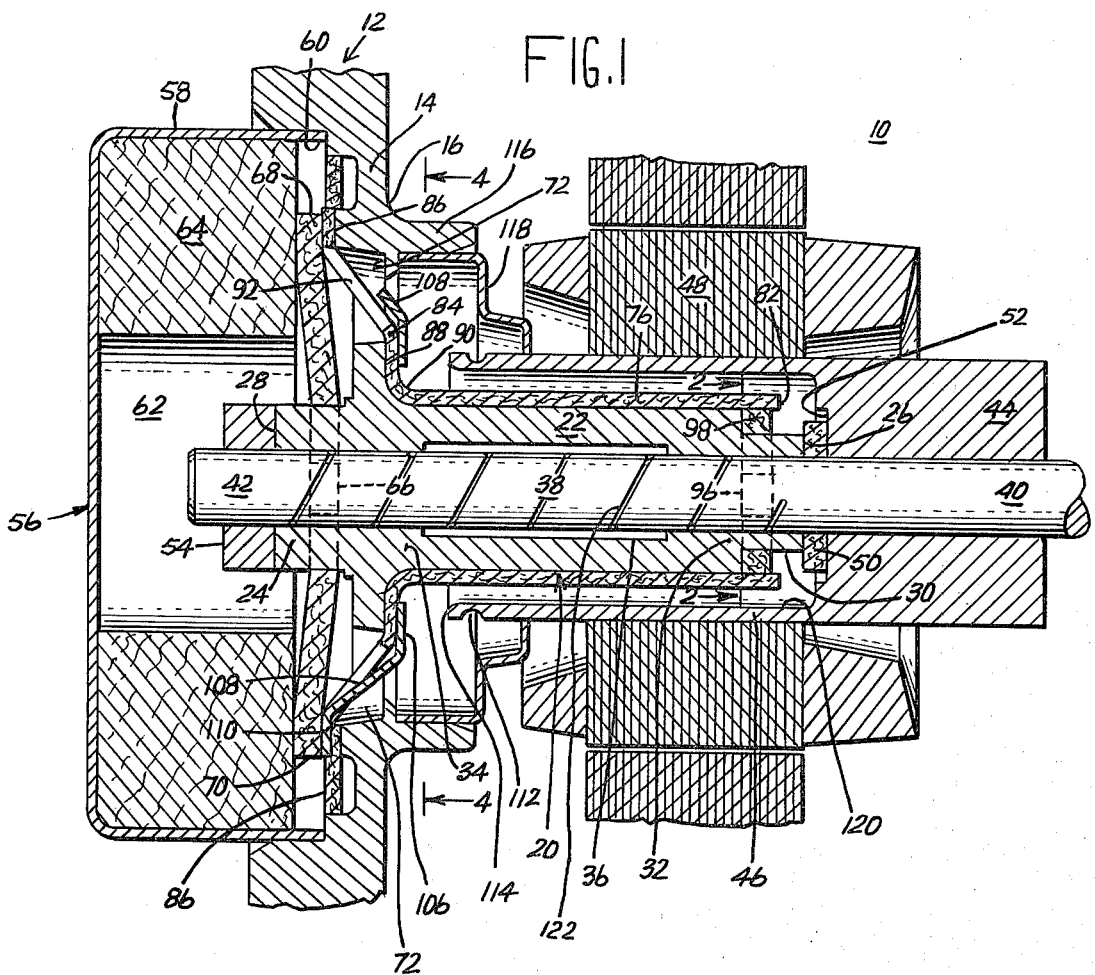
FIG. 1 is a side, cross-sectional view showing a part of a unit bearing motor incorporating one embodiment of the reversible lubrication system of the invention.
Figure 2:
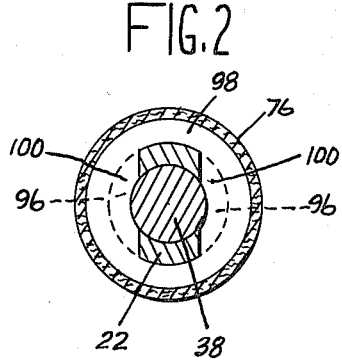
FIG. 2 is a cross-sectional view taken generally along the line 2—2 of FIG. 1.
Figure 3:
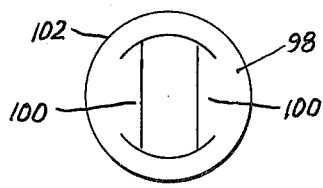
FIG. 3 is a side view of the annular wick member of FIGS. 1 and 2.
Figure 4:
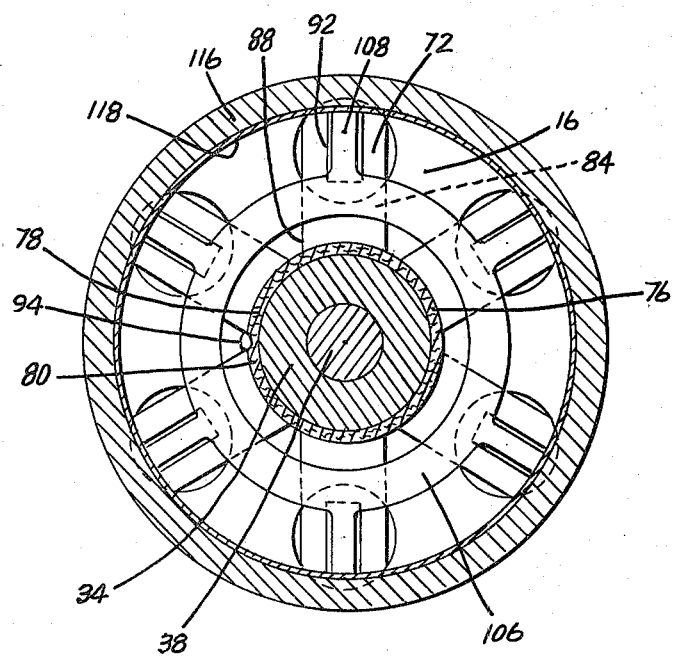
FIG. 4 is a cross-sectional view taken generally along the line 4—4 of FIG. 1.

Referring now to FIGS. 1 through 6 of the drawing, a portion of a unit bearing induction motor is shown, generally indicated at 10 in FIG. 1, which includes frame member 12 having wall 14 with opposite sides 16, 18. Bearing post 20 is integrally formed on wall 14 and has elongated portion 22 extending from side 16 of wall 14, and portion 24 extending from side 18.

Portion 22 of bearing post 20 has end 26, and portion 24 has end 28. Portion 22 of bearing post 20 is generally cylindrical in cross-section and may have a slight taper from side 16 of wall 14 toward end 26 to facilitate casting. Annular step 30 is formed in bearing post portion 22 extending from end 26. Spaced bearing portions 32, 34 are formed in bearing post portion 22 extending axially toward each other from ends 26, 28, bearing portions 32, 34 being spaced by relieved portion 36.

Shaft 38 of motor 10 is journalled in bearing portions 32, 34 of bearing post 20 and has portion 40 extending from end 26 and portion 42 extending from end 28. Hub member 44 is secured to extension portion 40 of shaft 38 and has sleeve portion 46 formed thereon extending toward wall 14 of frame member 12 and radially spaced from bearing post portion 22. Rotor 48 of motor 10 is mounted on sleeve portion 46 of hub member 44. End bump washer 50 on shaft 38 is positioned between end 26 of bearing post portion 22 and end 52 of hub member 44. Member 54 is secured to end portion 42 of shaft 38 and cooperates to retain shaft 38 and rotor 48 in assembled relation.

Cup member 56 has its side wall 58 engaging annular rabbet 60 in frame member 12 and defines lubricant reservoir 62 with side 18 of side wall 14, bearing post portion 24 extending into reservoir 62. Lubricant absorbent material 64 is disposed in reservoir 62 and has a quantity of lubricant therein. A pair of diametrically opposite slots 66 are formed in bearing portion 24 adjacent end 28 and respectively communicating with shaft extension 42. Annular wick 68 is seated in slots 66 so as to wipe shaft extension portion 42. Wick 68 adjacent its peripheral edge 70 engages absorbent material 64 so as to extract lubricant therefrom and feed it to bearing portion 34, in one direction of rotation of shaft 38 or to return lubricant wiped from shaft portion 42 to absorbent material 64 in the other direction of shaft rotation.

Openings 72 are formed in wall 14 communicating with reservoir 62. Wick member 74 is stamped or cut from a sheet of wick material, such as felt, and has portion 76 with side edges 78, 80 and end edge 82 (FIG. 5), side edges 78, 80 being slightly tapered to accommodate the slight taper of bearing post portion 22 as will be hereinafter described. Finger elements 84 have distal ends 86 and portions 88 joined to portion 76, as indicated by dashed line 90. Each finger element 84 has elongated opening 92 formed therein between distal end 86 and portion 88.

Portion 76 of wick 74 is wrapped around bearing post portion 22 with its side edges 78, 80 being joined, as by stitching at 94 (FIG. 4), and edge 82 overhanging annular notch 30 (FIG. 1). Finger elements 84 are folded upwardly about line 90 so as to extend radially outwardly from portion 76 of wick 74 (FIG. 4) and to extend through openings 72, portions 88 engaging side 16 of wall 14 of frame member 12 radially inwardly from opening 72 and distal ends 86 engaging side 18 of wall 14 radially outwardly from opening 72.

Diametrically opposite slots 96 are formed in bearing portion 32 adjacent end 26 through annular notch 30 to communicate with shaft 38. Annular wick 98 has portion 100 (FIG. 3) seated in slots 96 so as to wipe shaft 38, and has its periphery 102 engaging the inner surface of portion 76 of wick 74 adjacent end edge 82 (FIG. 1).

It will now be seen that finger elements 84 adjacent distal ends 86 engage wick member 68 adjacent its peripheral edge 70 thus extracting lubricant from absorbent material 64 and feeding the same to bearing portion 32 at the end of bearing post 20 opposite bearing portion 34 in said other direction of rotation of shaft 38, or returning lubricant wiped from shaft 38 to absorbent material 64 in said one direction.

In order to retain wick 74 in position, spring member 104 is provided comprising annular portion 106 with fingers 108 extending radially outwardly therefrom (FIG. 6), fingers 108 having distal ends 110. Annular portion 106 of spring member 104 engages portions 88 of finger elements 84 of wick member 74, fingers 108 respectively extend through openings 92 in finger elements 84 and through openings 72, and distal ends 110 respectively resiliently engage distal ends 86 of finger elements 84 (FIG. 1).

Sleeve portion 46 of hub member 44 has annular groove 112 formed in its outer surface adjacent its end 114 (FIG. 1) thereby forming a lubricant slinging portion. Wall 14 of frame member 12 has annular flange portion 116 extending from side 16 radially outwardly from openings 72. Cup member 118 is seated in annular flange portion 116 and surrounds sleeve portion 46. Thus any lubricant which passes through and out of bearing portion 32 will be thrown outwardly by centrifugal force onto the interior surface 120 of sleeve portion 46 of hub member 44 and will travel therealong to be thrown centrifugally by the lubricant slinger at end 114 into cup member 118 for return to absorbent material 64 in reservoir 62 through openings 72.

It will now be seen that by feeding lubricant to bearing portions 32, 34 at both ends of bearing post 20, lubrication is provided for rotation of shaft 38 in either direction. Spiral lubricant pumping groove 122 is preferably formed in shaft 38 extending between slots 66, 96 in bearing portions 34, 32, respectively, to insure a positive flow of lubricant from one wick to the other through bearing portions 32, 34. It will be seen that with shaft 38 rotating in one direction, groove 122 will pump lubricant from wick 68 in groove 66 through bearing portions 34, 32 to wick 98 in groove 96 for return to absorbent material 64 whereas, with shaft 38 rotating in the opposite direction, groove 122 will pump lubricant from wick 98 to wick 68 for return to absorbent material 64.

It will be understood that relieved portion 36 may be formed in shaft 38 rather than in bearing post portion 22 in which case, oil groove 122 will be divided into two sections respectively associated with bearing portions 32, 34. It will also be understood that in certain designs employing larger bearing clearances, undercut 36, in either bearing post portion 22 or in shaft 38, may not be required.

It will be readily apparent that portion 76 of wick 74 may be formed as a one piece sleeve rather than being wrapped around bearing post portion 22, as shown. Further, spring member 104, while desirable, may not be necessary in certain instances. It will also be seen that step 30 at end 26 of bearing post portion 22 is provided only to accommodate wick 98. Still further, slots 66, 96 in bearing portions 34, 32 may be eliminated with wicks 68, 98 wiping shaft 38 at bearing ends 28, 26, respectively.

The reversible lubrication system shown in FIGS. 1-6 and described above may be employed for rotation of rotor 48 and shaft 40 in either direction for unlimited periods of time. There are, however, motor applications in which shaft rotation is in one direction for normal operation with only intermittent, short-duration reversal, such as, for example, during the defrosting cycle of food freezer cabinets. In such applications, the lubricant storage capacity of wick 98 adjacent outboard end 26 of bearing post 20 alone, or in conjunction with portion 76 of wick sleeve 74 (finger elements 84 being eliminated) may be sufficient for the intermittent, short-duration reverse rotation of shaft 38.

Referring now to FIGS. 7 through 10, in which like elements are indicated by like reference numerals and similar elements by primed reference numerals, in this embodiment slots 66, 96 in bearing portions 24, 32 are eliminated and wicks 68', 98' wipe shaft 38 at bearing ends 28, 26, respectively. Here, wick member 76' does not include finger elements 86, and may have its end secured on bearing post portion 22 by wire retainer 126.

It will be seen that in the normal direction of rotation of shaft 38, wick 68' abstracts lubricant from lubricant absorbant material 64 in reservoir 62 and feeds the lubricant to end portion 42 of shaft 38. Lubricant pumping groove 122 provides a positive flow of lubricant from wick 68' to wick 98' which removes the lubricant from shaft 38 and feeds it to wick sleeve 76'. It will be noted that in due course wick 98' and wick sleeve 76' will become saturated with lubricant, however, excess lubricant which passes through bearing portion 32 will travel along surface 120 of sleeve portion 46 of hub member 44 and will be thrown outwardly by lubricant slinging groove 112 into cup member 118 for return to lubricant absorbent material 64 through opening 72 in side wall 14 of frame member 12. In the opposite direction of shaft rotation, the lubricant stored in wick 98' and wick sleeve 76' is fed to shaft 38 and caused to flow therealong by pumping groove 122 to wick 68' which removes the lubricant from shaft 38 and returns the same to absorbent material 64.

Figure 7:
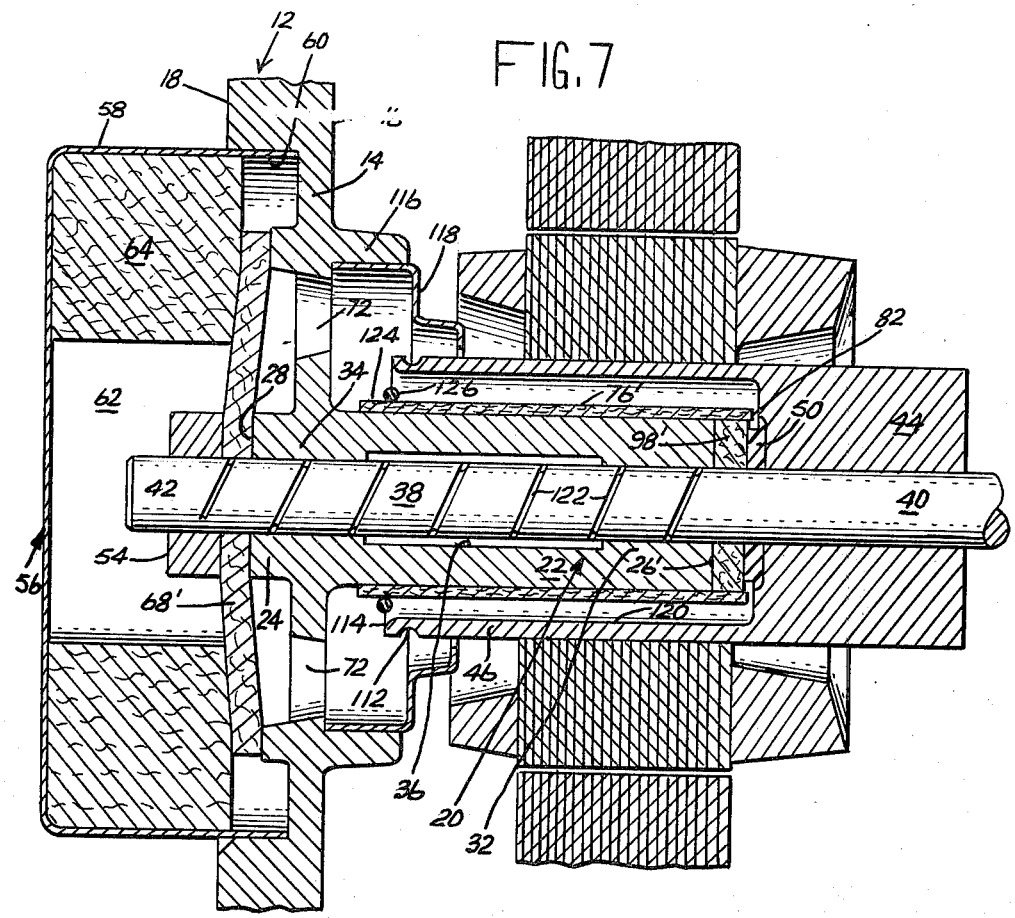
FIG. 7 is a side, cross-sectional view showing a part of a unit bearing dynamoelectric machine incorporating another embodiment of the reversible lubrication system of the invention.
Figure 8:
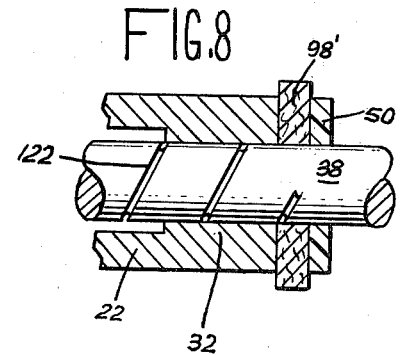
FIG. 8 is a fragmentary, cross-sectional view showing a modification of the embodiment of FIG. 7.

Referring briefly to FIG. 8, in applications where the reverse direction of rotation is very intermittent and of very short duration, wick sleeve 76' of FIG. 7 may be eliminated in its entirety and the storage capacity of wick 98' relied upon entirely to supply lubricant for the reverse direction of shaft rotation.

Figure 9:
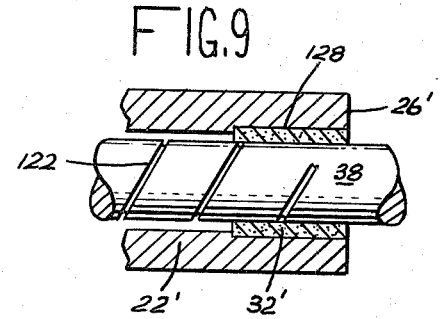
FIG. 9 is a fragmentary, cross-sectional view showing another modification of the embodiment of FIG. 7.
Figure 10:
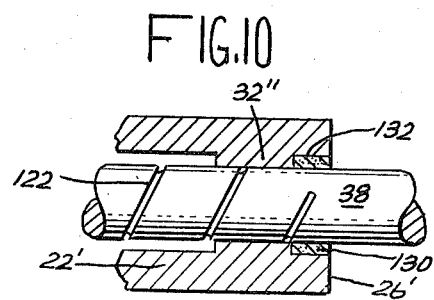
FIG. 10 is a fragmentary, cross-sectional view showing yet another modification of the embodiment of FIG. 7.

Referring now to FIG. 9, bearing portion 32' of bearing post portion 22' may comprise a separate member formed of suitable porous bearing material, such as bronze, seated in groove 128 in bearing post portion 22' adjacent end 26'. In FIG. 10, porous bearing insert 130 is seated in groove 132 at end 26' of bearing post portion 22' and forms a part of bearing portion 32". In the modification of FIG. 9, porous bearing insert 32', and in the modification of FIG. 10, porous bearing insert 130 has sufficient lubricant storage capability for brief, intermittent reverse operation.

While a unit bearing motor has been illustrated and described, it will be understood that the reversible lubrication system of the invention is applicable to two bearing motor as well.

While there have been described above the principles of this invention in connection with specific apparatus, it is to be clearly understood that this description is made only by way of example and not as a limitation to the scope of the invention.

What is claimed is:

1. In a unit bearing motor including a frame member having opposite sides and an elongated bearing post therein, said bearing post having first and second opposite ends with first and second bearing portions respectively extending axially inwardly from said ends, said bearing post having an elongated first portion extending from one side of said frame member to said first end, said bearing post portion being circular in cross-section, said bearing post having a second portion extending from the other side of said frame member to said second end, a shaft rotatably supported in said bearing portions and having a portion extending from said first end of said bearing post, a cup member secured to said other side of said frame member and enclosing said second portion of said bearing post to define a lubricant reservoir, said frame member having a plurality of openings formed therethrough outwardly from said bearing post and communicating with said reservoir, and lubricant absorbant material in said reservoir, a reversible lubrication system comprising: first wick means in said reservoir having a first portion arranged in lubricant-transfer relation with said absorbant material and a second portion arranged to wipe such shaft adjacent said second bearing portion, second wick means extending over said first bearing post portion and having a first portion extending through said frame openings and arranged in lubricant-transfer relation with said absorbant material and having a second portion arranged to wipe said shaft adjacent said first bearing portion, said second wick means including an elongated sleeve of wick material embracing said first bearing post portion and extending from said one side of said frame member to said first bearing post end, said sleeve having opposite ends, said first bearing post portion having at least one slot formed therethrough adjacent said first end and communicating with said shaft, said second portion of said second wick means including an annular wick member having a portion seated in said slot and wiping said shaft, said wick member having a peripheral surface engaging the inner surface of said sleeve adjacent one end thereof, said first portion of said second wick means comprising a plurality of finger elements respectively integral with and extending from the other end of said sleeve, said finger elements respectively extending through said openings, said finger elements respectively having distal ends arranged in lubricant-transfer relation with said first portion of said first wick means, said distal ends respectively engaging said other side of said frame member radially outwardly from said openings, said second portion of said bearing post having at least a second slot formed therethrough adjacent said second end and communicating with said shaft, said first wick means comprising a second annular wick member with said first portion thereof being seated in said second slot and wiping said shaft, said second portion of said second wick member extending radially outwardly beyond said frame openings, said second portion of said second wick member being adjacent the periphery thereof and being disposed between and respectively engaging said absorbant material and said distal ends of said finger elements, and a spring member for retaining said finger elements in operative position.

2. The lubrication system of claim 1 wherein the portions of said finger elements adjacent their junctions with said sleeve respectively engage said one side of said frame member radially inwardly from said openings, said spring member resiliently engaging said finger element portions and said distal ends thereby to retain the same in engagement with said sides of said frame member, respectively.

3. The lubrication system of claim 2 wherein said finger elements have openings formed therethrough intermediate said portions and distal ends, said spring member having an annular portion surrounding said first portion of said bearing post and sleeve and engaging said finger element portions thereby to retain the same in engagement with said one side of said frame member, and a plurality of resilient fingers extending radially outwardly from said annular portion, each of said fingers extending through a said opening in a respective finger element and having a distal end resiliently engaging the distal end of a respective finger element thereby to retain the same in engagement with said other side of said frame member.

4. The lubrication system of claim 3 wherein said sleeve comprises a sheet of wick material having opposite side edges, said sheet being wrapped around said first portion of said bearing post, and means for joining said side edges of said sleeve.

* * * * *